US008816632B2

(12) United States Patent
Winfield et al.

(10) Patent No.: US 8,816,632 B2
(45) Date of Patent: Aug. 26, 2014

(54) RADIO FREQUENCY POWER TRANSMISSION SYSTEM

(75) Inventors: Donald Winfield, Camillus, NY (US); John R. Smigel, Liverpool, NY (US); Frank S. Rotondo, Lynbrook, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 699 days.

(21) Appl. No.: 12/769,491

(22) Filed: Apr. 28, 2010

(65) Prior Publication Data

US 2011/0266995 A1 Nov. 3, 2011

(51) Int. Cl.
*H02J 7/00* (2006.01)
*H01M 10/44* (2006.01)
*H01M 10/46* (2006.01)

(52) U.S. Cl.
USPC .......................................... 320/101; 320/108

(58) Field of Classification Search
USPC .......................................... 320/101, 103, 108
See application file for complete search history.

(56) References Cited

U.S. PATENT DOCUMENTS

| | | | | |
|---|---|---|---|---|
| 3,957,230 | A * | 5/1976 | Boucher et al. | 244/53 R |
| 6,967,462 | B1 * | 11/2005 | Landis | 320/101 |
| 7,068,991 | B2 * | 6/2006 | Parise | 455/343.1 |
| 2007/0034247 | A1 * | 2/2007 | Takada et al. | 136/244 |
| 2007/0139010 | A1 * | 6/2007 | Bonneau et al. | 320/125 |
| 2008/0143292 | A1 * | 6/2008 | Ward | 320/101 |
| 2008/0224652 | A1 * | 9/2008 | Zhu et al. | 320/101 |

OTHER PUBLICATIONS

Jacob Gavan and Saad Tapuch, "iMicrowave Wireless-Power Transmission to High Altitude Platform Systems", Radio Science Bulletin, No. 334, p. 25-42 of the RBS 334 2010.
Appendicies for "iMicrowave Wireless-Power Transmission to High Altitude Platform Systems", Radio Science Bulletin, No. 334, p. 25-42 of the RBS 334 2010.
Hiroshi Matsumoto, Yoshitaka Hashino, Hiroyuki Yashiro, Naoki Shinohara, and Yoshiharu Omura, "Computer Simulation on Nonlinear Interaction of Intense Microwave with Space Plasmas", Electronics and Communications in Japan, Part 3, vol. 78, No. 11, 1995. (Translated from Denshi Joho Tsushin Gakkai Ronbunshi. vol. 78-BLI, No. 3, Mar. 1995, pp. 119-129).
Hiroshi Matsumoto, Hisashi Hirata, Yoshitaka Hashino, and Naoki Shinohara, "Theoretical Analysis of Nonlinear Interaction of Intense Electromagnetic Wave and Plasma Waves in the Ionosphere", Electronics and Communications in Japan, Part 3, vol. 78, No. 11, 1995 (Translated from Denshi Joho Tsushin Gakkai Ronbunshi, vol. 78-B-XI, No. 3, Mar. 1995, pp. 130-138).
Naoki Shinohara and Hiroshi Matsumoto, " Dependence of dc Output of a Rectenna Array on the Method of Interconnection of Its Array Elements", Electrical Engineering in Japan, vol. 125, No. 1, 1998 (Translated from Denki Gakkai Ronbunshi, vol. 117-B, No. 9, Sep. 1997, pp. 125✓ 1261).
A. Celeste, P. Jeanty, and G. Pignolet, "Case study in Reunion Island", Acta Astronautica, vol. 54, pp. 253-258, 2004.

(Continued)

*Primary Examiner* — Samuel Berhanu
(74) *Attorney, Agent, or Firm* — Howard IP Law Group, PC

(57) ABSTRACT

A wireless power transmission system for use in a mobile asset comprising a host transmitter for providing at least one of a microwave or a lightwave energy signal, a receiver configured to receive said signal, a converter for converting said signal to a storable energy form, and a controller to control the transfer of storable energy from said converter to at least one energy storage device.

19 Claims, 4 Drawing Sheets

(56) References Cited

OTHER PUBLICATIONS

URSI Inter-commission Working Group on SPS, "URSI White Paper on Solar Power Satellite (SPS) Systems and Report of the URSI Inter-Commission Working Group on SPS", Jun. 2007.

Tesla, N., "The transmission of electric energy without wires", The thirteenth Anniversary Number of the Electrical World and Engineer, Mar. 5, 1904.

Tesla, N., "Experiments with Alternate Current of High Potential and High Frequency", McGraw Pub. Co., N.Y., 1904.

Brown, W. C., "The History of Power Transmission by Radio Waves", IEEE Trans. MTT, vol. 32, No. 9, 1984, pp. 1230-1242.

Brown, W. C., "Adapting Microwave Techniques to Help Solve Future Energy Problems", 1973 G-MTT International Microwave Symposium Digest of Technical Papers 73.1, 1973, pp. 189-191.

Matsumoto, H., "Research on Solar Power Station and Microwave Power Transmission in Japan : Review and Perspectives", IEEE Microwave Magazine, Dec. 2002, pp. 36-45.

Schlesak, J. J. A. Alden and T. Ohno, A microwave powered high altitude platform, IEEE MTT-S Int. Symp. Digest, 1988, pp. 283-286.

http://friendsofcrc.ca/SHARP/sharp.html.

McSpadden, J. O. and J. C. Mankins, "Space Solar Power Programs and Microwave Wireless Power Transmission Technology", IEEE Microwave Magazine, Dec. 2002, pp. 46-57.

* cited by examiner

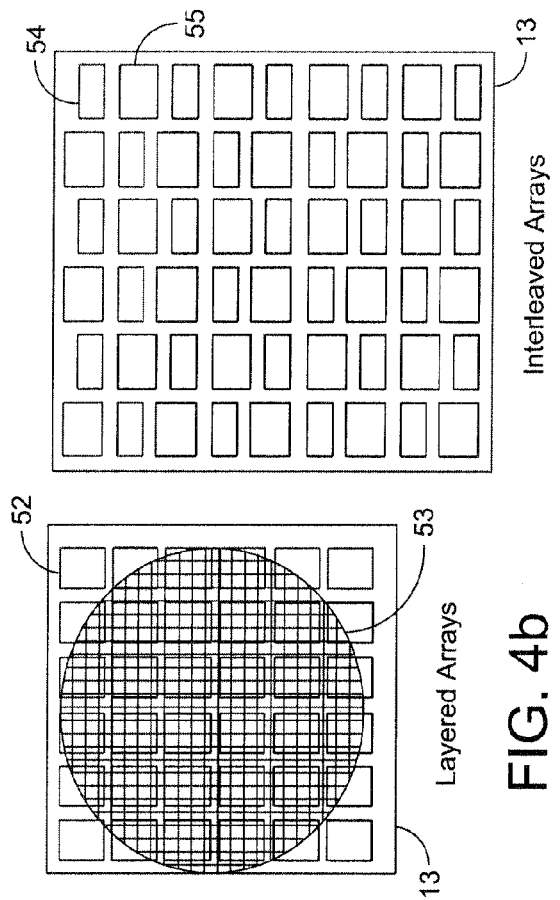
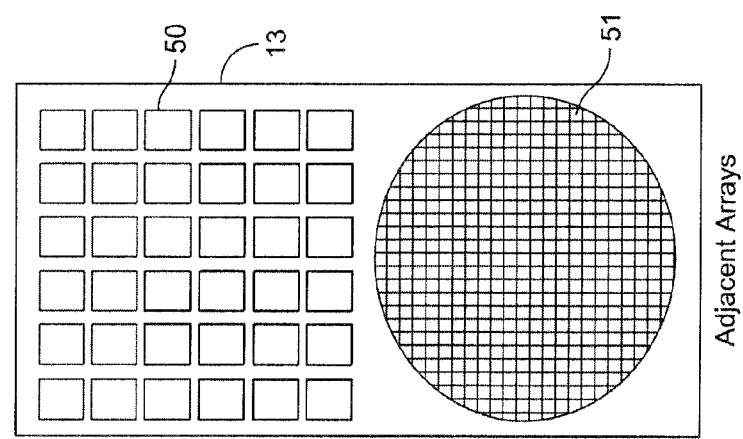
FIG. 4c Interleaved Arrays
FIG. 4b Layered Arrays
FIG. 4a Adjacent Arrays

RADIO FREQUENCY POWER TRANSMISSION SYSTEM

FIELD OF THE INVENTION

The present invention relates to wireless energy transmission, more specifically to a wireless energy transmission and storage system.

BACKGROUND

The operation of many mobile devices, including vehicles, is limited by the amount of onboard energy they are able to store. For example, in battery or gasoline powered vehicles, the weight and/or size of the batteries, fuel, or storage units thereof are limiting factors on the effective operating range of the asset. These operating range limitations, as well as costly and time consuming refueling or recharging procedures, can severely limit the performance of these assets.

Unmanned Aerial Vehicles (UAVs), for example, can carry critical intelligence, surveillance, and reconnaissance (ISR) payloads, such as cameras or video recorders, but their flight time is limited by the amount of onboard energy resources. Increasing these resources for long duration flights adds significant weight to the aircraft, thus reducing performance. Moreover, when operating a UAV from ships at sea, the UAV must be landed to be refueled or recharged. This is generally accomplished by catching the UAV in a net, typically resulting in damage to the asset. These landings also disrupt the ship's operations. Likewise UAV's associated with a moving convoy need to depart the convoy and return to a landing field to be refueled. Accordingly, it would be advantageous to allow a UAV to remain airborne without landing to refuel onboard energy sources.

While the above describes typical problems associated with UAVs, other types of assets, including many types of land and sea based vehicles, may not have immediate access to fuel or other energy supplies, and suffer similar reductions in performance as increased energy payloads are added to improve range.

Accordingly, a method of remotely supplying energy to these assets is desired.

SUMMARY

In one embodiment of the present invention, a wireless energy transmission and storage system is provided. The system includes a first microwave transmission source and a second lightwave transmission source. The output of the first and second sources are received by a hybrid array arranged on an asset and configured to convert the received microwaves and lightwaves into direct current. An energy storage device is operatively connected to the hybrid array and configured to store the power delivered therefrom. A controller is provided and configured to control the supply of power from the hybrid array to the energy storage device.

BRIEF DESCRIPTION OF THE DRAWINGS

FIGS. 4a-c show various embodiments of receiving array antennas.

DETAILED DESCRIPTION OF PREFERRED EMBODIMENTS

Reference will now be made in detail to the present exemplary embodiments of the invention, examples of which are illustrated in the accompanying drawings.

Figure 1:
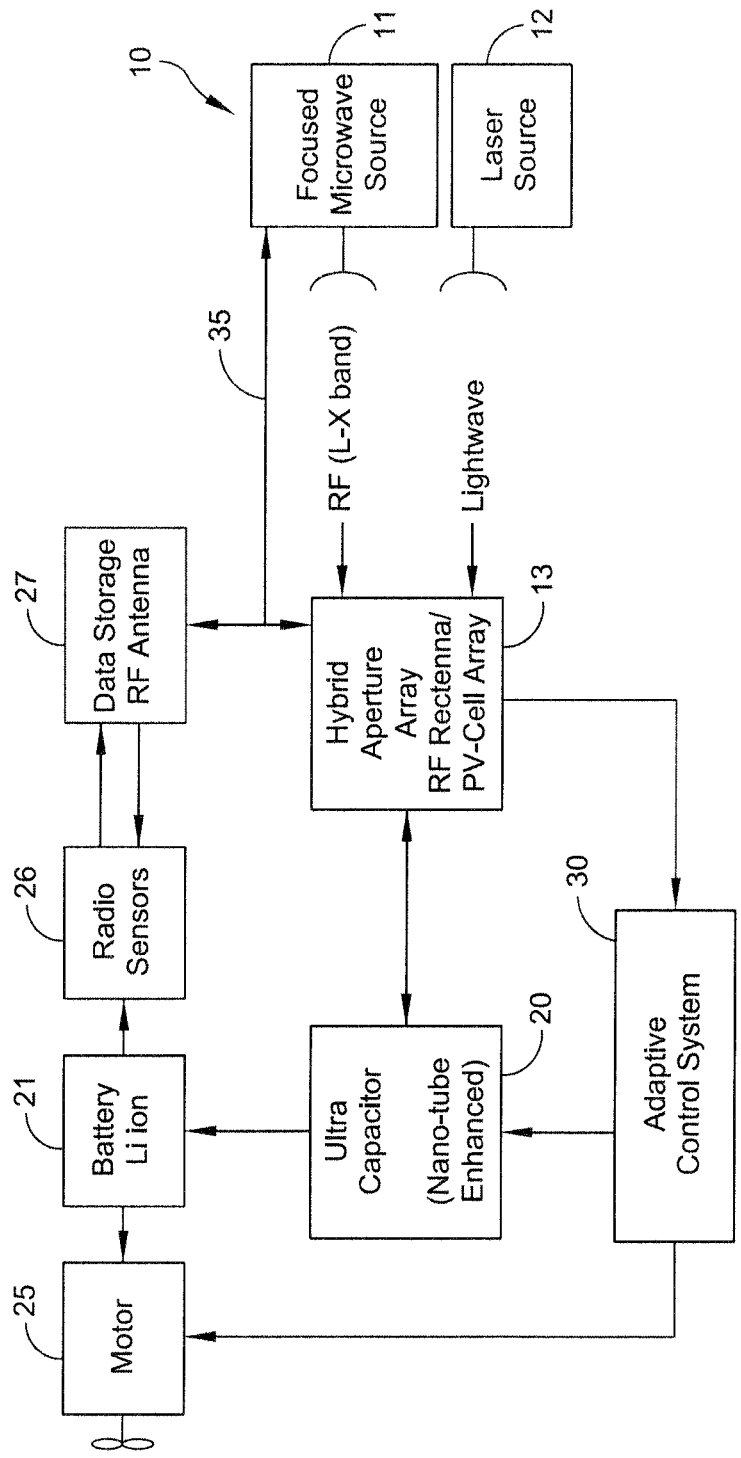
FIG. 1 is a block diagram illustrating a wireless energy transmission and storage arrangement according to a first embodiment of the present invention.

With reference to FIG. 1, an embodiment of the power transmission and storage system is shown as it may be applied to a mobile asset, such as a UAV. A host platform 10 is provided and preferably comprises at least one microwave transmitting, or transmitting and receiving, source 11, for example a focused radar antenna, and at least one lightwave transmitting source 12, such as a laser transmitter. In a preferred embodiment, the microwave transmitting source 11 operates on L, X, or S bands, such as those used in conventional radar systems, and the lightwave transmitting source 12 operates to provide electromagnetic radiation in the form of, for example, a visible light laser, infrared laser, or ultraviolet laser. The host platform 10 maybe located on the ground, aircraft, sea ship, or any suitable location depending on the application. It is also envisioned that the host platform 10 may comprise a mobile arrangement.

The microwave and lightwave sources 11,12 preferably operate in parallel to transmit respective energy signals to at least one array 13. In a preferred embodiment, the at least one array 13 is located on a mobile asset, for example, a UAV used for surveillance and intelligence gather purposes. However, it is envisioned that a similar array 13 could be placed on any air, land, or sea vehicle, as well as on any other suitable portable devices.

As shown in FIG. 4a, the array 13 may comprise two or more distinct receiving elements, such as a microwave antenna 50 and an arrangement photovoltaic (PV) cells 51 for receiving each of the microwave and lightwave transmissions. Alternatively, the array may comprise a single hybrid array configured to receive both microwave and lightwave transmissions. In either embodiment, it is preferred that the array 13 also convert the received signals to a form of usable power, for example, direct current.

The array 13 may comprise a hybrid arrangement of photovoltaic cells for receiving and converting lightwaves into direct current, and a diode-based rectifying antenna (rectenna) for receiving and converting microwaves into direct current. In an alternate embodiment, the rectenna may be replaced with any suitable microwave receiving antenna and a separate rectifying circuit provided for the production of direct current.

This hybrid array 13 may be formed by any known method in the art. For example, as shown in FIG. 4b, it is envisioned that the array may be formed on a flexible substrate, as is typically used in roll-to-roll electronics. A metallic pattern of microwave antenna elements 52 could be applied to the substrate, defining voids which allow the passage of visible light therethrough. A PV cell array 53 may be disposed within these voids to absorb the lightwave transmission. This array arrangement 13 could be mounted to, for example, the underside of the UAV. In another embodiment shown in FIG. 4c, the microwave antenna elements 54 and PV cell array 55 comprise and interleaved arrangement.

Arranging the PV cells within the microwave receiving portion of the array 13 aids efficient energy transfer. Specifically, laser and other types of lightwaves are transmitted in a narrow, focused beam. Thus, this beam needs to be accurately aimed onto PV cells to achieve ideal energy transfer. In a preferred embodiment, in addition to providing a power signal, the microwave transmitter 11 may be configured to track the asset, and provide a positional reference for the accurate transmission of lightwaves. To facilitate this beam steering, an RF link 35 may be provided between the array 13 and the host platform 10, conveying, for example, positional information of the UAV, more specifically, the position of the array 13.

Power provided by the array 13 is supplied to an energy storage device, for example, a capacitor 20, battery 21, or a combination thereof. In a preferred embodiment, the converted power is stored in a capacitor 20 during a charging cycle, and slowly discharged to a battery 21 during and/or after the charging cycle has been completed. The capacitor 20 may comprise an ultracapacitor or a nano-tube enhanced capacitor for increased storage capacity.

Figure 3:
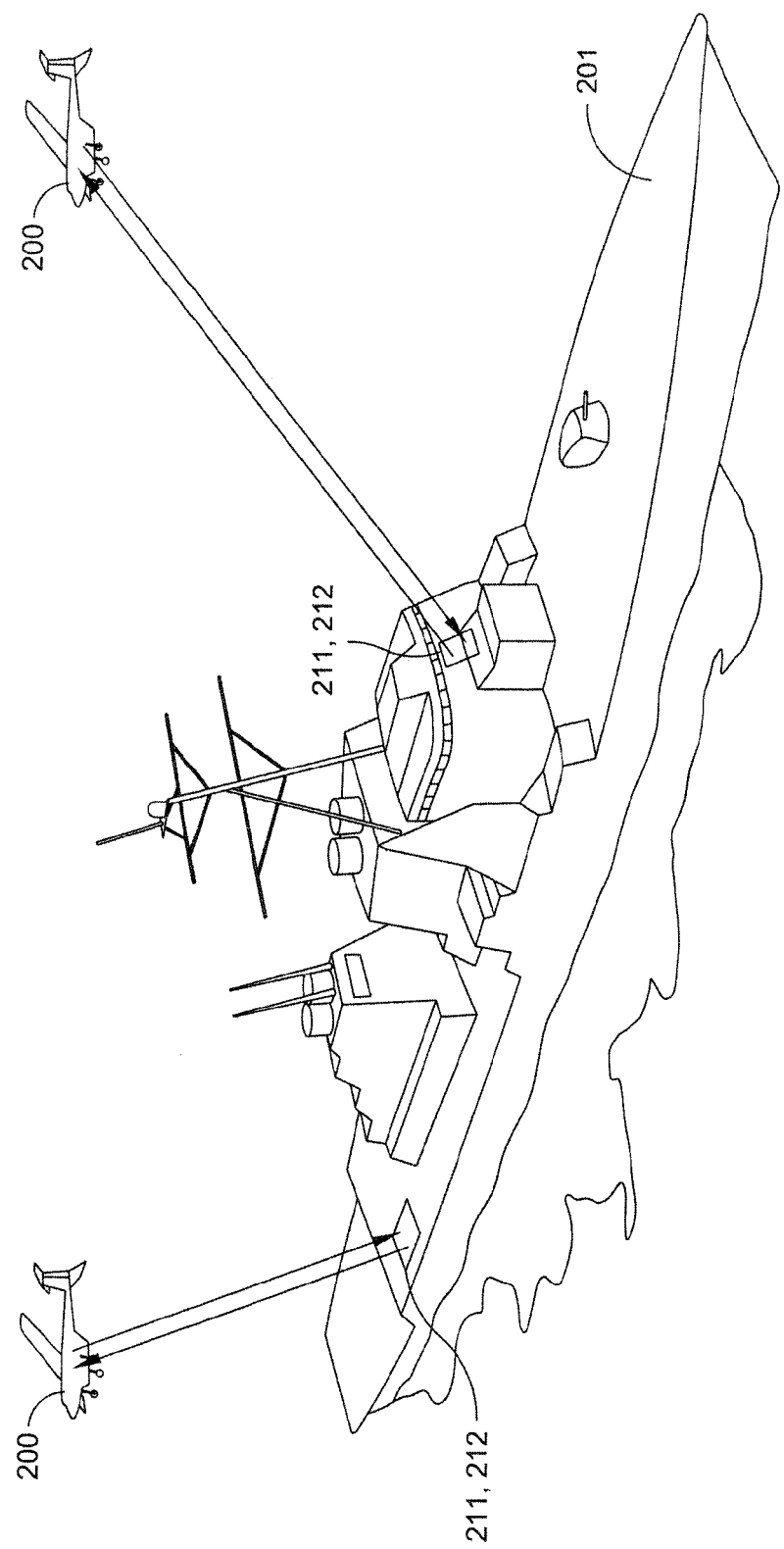
FIG. 3 shows an exemplary embodiment of the present invention comprising a UAV being charged by a host ship.

Applying the power to a capacitor provides added benefits over charging a battery directly. Notably, a capacitor may be charged at a significantly higher rate of speed than conventional batteries. Accordingly, an asset would only be required to be in range of the host platform 10 for short periods of time during a charging cycle. For example, FIG. 3 shows an exemplary UAV 200 in a flight path circling a host ship 201. Arranged on the ship 201 are microwave and lightwave transmission sources 211,212, which provide the above-described energy transmission signal to the UAV 200. Once the capacitor 20 is charged, the UAV 200 or other asset would be free to leave the range of the host platform 201, and the capacitor could be discharged into the battery at an optimal charging rate as the asset continues on its mission.

In an alternate embodiment, the battery 21 may be eliminated, and the capacitor 20 retained as the sole method of storing power received from the array 13. This embodiment may prove especially advantageous as capacitor technology improves, and capacitor power densities rise. Similarly, a simplified arrangement may provide only a battery or plurality of batteries for storing the power received from the array 13. Any of the above-described arrangements may be implemented depending on a number of considerations, such as the cost, weight, or functional requirements of a particular asset.

Energy stored in the capacitor 20 or battery 21 may be used to power an asset's drive system, such as an electric motor 25. Moreover, this power may be used by any of the asset's subsystems including but not limited to: sensors 26, surveillance devices such as cameras or video recorders, additional antennas 27 for transmitting and/or receiving data or control signals, as well as positioning or control systems.

The charging of the energy storage device is controlled by a control system 30. Specifically, the control system 30 controls the power output of the array 13. For example, impedance, voltage, and/or current levels may be monitored and/or controlled in order to ensure proper charging of the energy storage device. Moreover, any number of suitable devices, including voltage converters, amplifiers, and filters may be included in the array 13, control system 30, or additional circuits (not shown) in order to properly condition the output of the array 13 to be received by the energy storage device. In the embodiment in which a capacitor 20 is initially charged, and the power stored therein later applied to a battery 21, the control system 30 may act to control the rate of discharge of the capacitor 20, and therefore the rate of charge of the battery 21.

The control system 30 may be operatively connected to at least one of the capacitor 20, battery 21, and the above-mentioned sub-systems of the asset. In this way, the control system 30 may monitor the voltage levels of the capacitor 20 and/or battery 21 in order to determine when a full charge has been reached. Once a completed charging cycle has been detected, the control system 30 may discontinue power transmission from the array 13. Likewise, the control system 30 may provide a signal to the operator of the asset, through, for example, an RF antenna provided on the asset, giving notice of the competed charge cycle. Similarly, the control system 30 can provide continuous, real-time system power level and consumption data to an operator.

Because the control system 30 may be tied to both the power consuming devices of the asset, as well as the energy storage device(s), the control system 30 may monitor both power usage and current power levels in order to predict expected battery life. This information made be forwarded to the asset's operator, and/or used to alter the asset's power usage in real-time, for example, reducing or eliminating power applied to non-critical systems in order to extend the operating range of the asset.

The control system 30 also may be operatively coupled to a transponder and/or GPS system of the asset. In this way, the control system 30 may convey positional information, for example, through the RF link 35 between the array 13 and the host platform 10 in order to facilitate accurate targeting of the array 13 by the transmitters 11,12. This positional information may likewise be used to determine the asset's proximity to a given host transmitter 10. In this way, the control system 30 may provide an operator with a power level warning that varies according to the asset's distance from the host platform 10.

Figure 2:
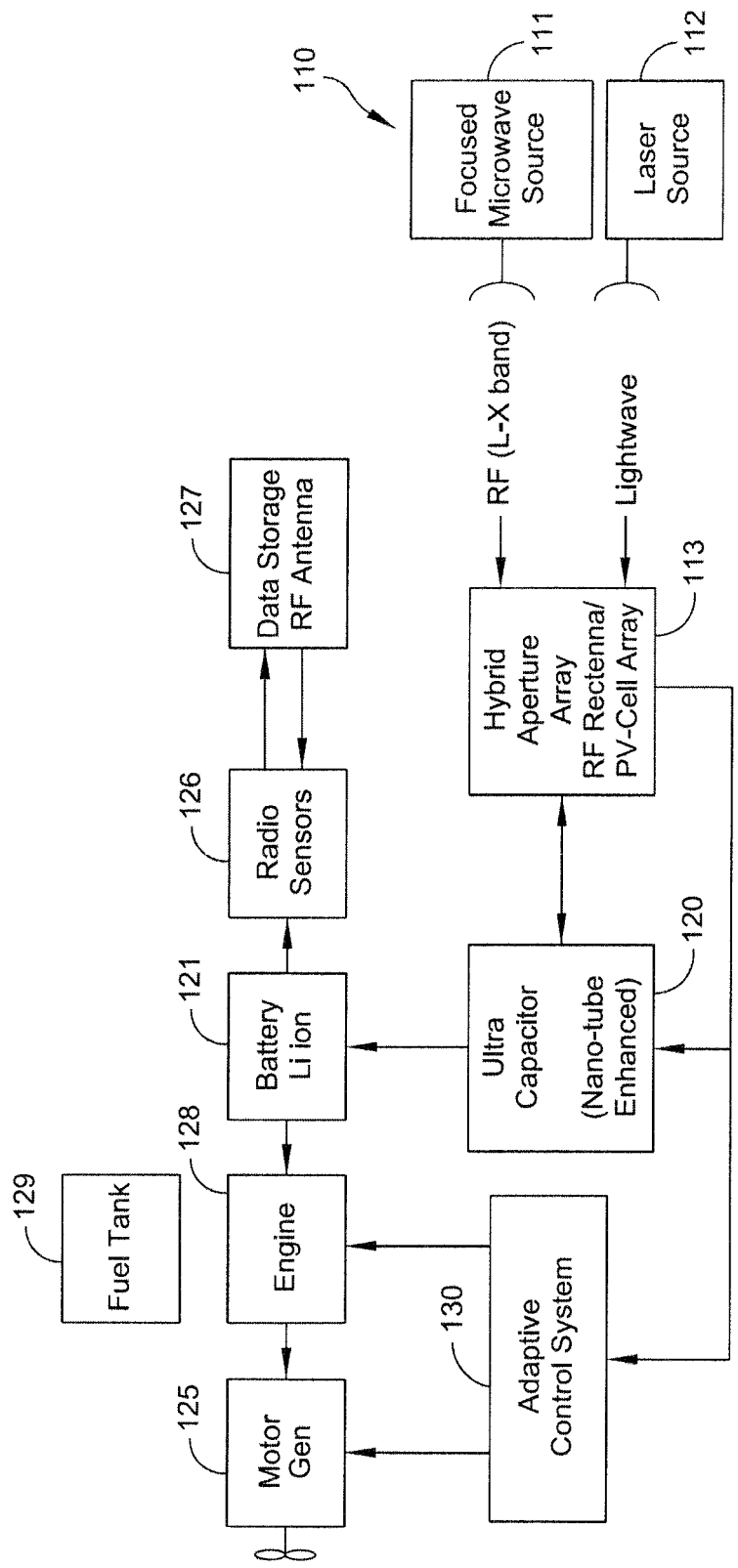
FIG. 2 is a block diagram illustrating a wireless energy transmission and storage arrangement used in a hybrid asset application.

In an alternate embodiment shown in FIG. 2, the energy transfer system may be applied to a hybrid-powered asset. In this embodiment, charging of the capacitor 120 and/or battery 121 is achieved in the same fashion described above with respect to the previous embodiment, with the control system 130 operating to control the charging of the energy storage device(s). The energy supplied by the host platform 110 may be used to power a portion of a hybrid drive system. For example, it is envisioned that the asset may possess alternate energy supplies, such as an onboard fuel tank 129 for the storage of liquid or gas fuels. In the case of a UAV, these fuels may be used to power an engine 128 for all or a portion of a flight. For example, an internal combustion engine 128 may be used to propel an asset to a desired altitude, wherein the electric motor 125 could take over. This would eliminate the heavy power consumption associated with the climb. The motor 125 could also operate as a generator, driven by the engine 128, for providing additional power to the energy storage device(s). The motor 125 could also be implemented in situations were quiet operation is required, for example during covert reconnaissance missions in hostile areas.

In yet another embodiment, electrical power may be used to power the asset's electrical systems, such as control and communication systems, rather than its propulsion system. For example, the asset's engine 128 may run on liquid fuel, and the control systems, data recording and storage devices, and communications systems may be provided power from the battery 121 and/or capacitor 120. In this way, the range of the asset may be increased, as the onboard engine 128 would not be required to run a generator for supplying power to these subsystems.

In any of the above-described embodiments, the control system 130 may operate in a similar manner to that described with respect to FIG. 1. Specifically, the control system 130 may monitor and/or control the power output of the array 113 to the capacitor 120 or battery 121, the discharge of the capacitor 120 to the battery 121, the battery and/or capacitor levels, the power usage of the system, in addition to provide positioning information to the host platform 110 for accurate aiming of the transmitters 111,112, as well as regulate between operation of the asset under power of the engine 128 or the motor 125 depending on desired performance characteristic, and/or power or fuel levels.

The following describes basic energy transmission principles as well as estimations for the performance of the above-described systems.

The effective power transmitted from the host transmitting array is equal to the transmit power ($P_t$) multiplied by a transmit gain ($G_t$):

Effective Power=$P_t G_t$

Power density ($P_d$) is equal to effective power divided by a function of the transmission distance, specifically:

$P_d$=Effective Power/$4\pi R^2$

Power received by the receiving array is a function of the power density, multiplied by the effectiveness of the receiving array ($A_e$).

Received Power=$P_d A_e$ with $A_e = G_r \lambda^2 / 4\pi$ $G_r$ denotes receiver gain which takes into account transmission losses, array inefficiency, and ohmic losses. According, power received ($P_r$) is equal to:

$P_r = P_t G_t G_r \lambda^2 / (4\pi R)^2 = P_t G_t A_e / (4\pi R^2)$

The table below indicates estimated transmitted and received power levels based on a 50 meter transmission range, a receiving array having an area of approximately 1.77 square meters, and typical or assumed values of L, S, and X band microwave transmissions:

|  | L Band | S Band | X Band |
| --- | --- | --- | --- |
| Avg Rad. Pt (kW) | 3.75 | 2.0 | 0.5 |
| Gt (dB) | 40 | 34 | 31.7 |
| Ae (m2) | 1.77 | 1.77 | 1.77 |
| R (m) | 50 | 50 | 50 |
| Avg Pr (kW) | 2.1 | 0.53 | 0.31 |
| Conv. Eff. | 0.7 | 0.7 | 0.7 |
| Power Out (kW) | 1.5 | 0.37 | 0.22 |

While the foregoing describes exemplary embodiments and implementations, it will be apparent to those skilled in the art that various modifications and variations can be made to the present invention without departing from the spirit and scope of the invention.

What is claimed is:

1. A wireless power transmission system comprising:
 a first transmitter configured to selectively transmit a microwave energy signal;
 a second transmitter configured to selectively transmit lightwave energy signal;
 at least one receiver adapted to receive over the air the microwave energy signal and the lightwave energy signal;
 at least one energy converting device configured to convert said received microwave energy signal and said received lightwave energy signal into a storable energy form;
 an energy storage device coupled to the at least one energy converting device for storing said energy; and
 a controller operative to control the delivery of storable energy from the energy converting device to the energy storage device,
 wherein said controller is responsive to a global positioning system for providing positional information data to said first and second transmitters to facilitate directing said microwave energy signal and said lightwave energy signal to said at least one receiver.

2. The system of claim 1, wherein the at least one receiver and the at least one energy converting device comprise a rectifying antenna configured to receive said microwave energy signal and convert said energy signal to direct current.

3. The system of claim 1, wherein the at least one receiver and the at least one energy converting device comprise at least one photovoltaic cell configured to receive and convert said lightwave energy signal into direct current.

4. The system of claim 1, wherein the at least one receiver and the at least one energy converting device comprise a hybrid array configured to receive and convert both said microwave and lightwave energy signals to direct current.

5. The system of claim 4, wherein the hybrid array comprises at least one photovoltaic cell and at least one rectifying antenna.

6. The system of claim 1, wherein the energy storage device comprises at least one capacitor.

7. The system of claim 1, wherein the energy storage device comprises at least one battery.

8. The system of claim 1, wherein the energy storage device comprises at least one capacitor coupled to at least one battery, the capacitor configured to be charged by said at least one energy converting device, said battery configured to be charged by said at least one capacitor.

9. The system of claim 8, wherein said controller controls the charging of said at least one battery by said at least one capacitor.

10. The system of claim 1, wherein said at least one receiver is located on a vehicle, and wherein said first and second transmitters are arranged on a host platform.

11. The system of claim 10, wherein said vehicle is an unmanned aircraft.

12. The system of claim 1, wherein said controller is configured to monitor energy levels stored in said energy storage device, and detect if said energy levels fall below a predetermined threshold level.

13. The system of claim 1, wherein said first and second transmitters are configured to provide the microwave energy signal and the lightwave energy signal in parallel to said at least one receiver.

14. The system of claim 1, wherein said second transmitter comprises one of a visible light, infrared, or ultraviolet laser.

15. A wireless power transmission system comprising:
 at least one receiver adapted to receive over the air a microwave energy signal and a lightwave energy signal;
 at least one energy converting device configured to convert said received microwave energy signal and said received lightwave energy signal into a storable energy form;
 a first transmitter configured to selectively provide the microwave energy signal;
 a second transmitter configured to selectively provide the lightwave energy signal;
 an energy storage device coupled to the at least one energy converting device for storing said energy; and
 a controller operative to control the delivery of storable energy from the energy converting device to the energy storage device,
 wherein said controller is responsive to a global positioning system for providing positional information data to said first and second transmitters to facilitate directing said microwave energy signal and said lightwave energy signal to said at least one receiver.

16. The system of claim 10, wherein said vehicle comprises an electrically powered vehicle.

17. The system of claim 16, wherein said vehicle comprises a hybrid vehicle having at least one electric motor and at least one non-electric engine.

18. A method for wirelessly transmitting power comprising the steps of:
- receiving a global positioning system signal comprising positional information;
- selectively wirelessly transmitting microwave signals in a direction indicated by the global positioning system signal by a first transmitter;
- selectively wirelessly transmitting lightwave energy signals in a direction indicated by the global positioning system signal by a second transmitter;
- receiving said microwave and lightwave signals over the air;
- converting said signals to usable power; and
- storing said usable power in at least one storage device.

19. The method of claim 18, wherein the step of storing said usable power in at least one storage device comprises storing said usable power in a capacitor, and discharging said capacitor into a battery.

* * * * *